(12) United States Patent
Woundy et al.

(10) Patent No.: US 11,184,187 B2
(45) Date of Patent: Nov. 23, 2021

(54) METHOD AND SYSTEM FOR INTERNET PROTOCOL PROVISIONING OF CUSTOMER PREMISES EQUIPMENT

(75) Inventors: Richard Woundy, North Reading, MA (US); John G. Bevilacqua, Boulder, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 271 days.

(21) Appl. No.: 12/829,748

(22) Filed: Jul. 2, 2010

(65) Prior Publication Data

US 2010/0274882 A1    Oct. 28, 2010

Related U.S. Application Data

(63) Continuation of application No. 10/570,832, filed as application No. PCT/US2004/028907 on Sep. 7, 2004, now Pat. No. 7,774,436.

(60) Provisional application No. 60/501,231, filed on Sep. 5, 2003.

(51) Int. Cl.

| | |
|---|---|
| *H04L 12/28* | (2006.01) |
| *H04N 21/61* | (2011.01) |
| *H04N 21/643* | (2011.01) |
| *H04N 21/4227* | (2011.01) |

(Continued)

(52) U.S. Cl.
CPC ...... *H04L 12/2801* (2013.01); *H04L 61/2015* (2013.01); *H04L 67/125* (2013.01); *H04L 67/303* (2013.01); *H04N 21/4227* (2013.01); *H04N 21/6118* (2013.01); *H04N 21/64322* (2013.01)

(58) Field of Classification Search
CPC ......... H04L 2012/5642; H04L 12/2801; H04L 61/2015; H04L 67/125; H04L 67/303; H04N 21/6118; H04N 21/64322; H04N 21/4227

See application file for complete search history.

(56) References Cited

U.S. PATENT DOCUMENTS

| | | | | |
|---|---|---|---|---|
| 5,745,837 | A | * | 4/1998 | Fuhrmann ...................... 725/114 |
| 5,926,104 | A | * | 7/1999 | Robinson .......... H04L 29/12113 |
| | | | | 340/7.23 |
| 6,018,625 | A | * | 1/2000 | Hayball et al. .................. 703/22 |

(Continued)

OTHER PUBLICATIONS

International Search Report for related International Application No. PCT/US04/28908, dated Aug. 26, 2005,1 page.

(Continued)

*Primary Examiner* — Patrice L Winder
*Assistant Examiner* — Angela M Widhalm De Rodrig
(74) *Attorney, Agent, or Firm* — Banner & Witcoff, Ltd.

(57) ABSTRACT

Method and system for Internet Protocol (IP) provisioning over a cable network. The method and system including a plurality of embedded settop boxes (eSTBs) of at least two different vendors requesting IP provisioning according to a first protocol. The method and system further including a network provisioning unit (NPU) in communication with the eSTBs over the network for responding to the eSTB IP provisioning requests with IP provisioning data, wherein the eSTB IP provisioning data is outputted according to the first protocol such that provisioning of the eSTBs is standard for each vendor in so far as each eSTB utilizes the first protocol for provisioning.

22 Claims, 1 Drawing Sheet

(51) Int. Cl.
*H04L 29/12* (2006.01)
*H04L 29/08* (2006.01)

(56) References Cited

U.S. PATENT DOCUMENTS

| | | | |
|---|---|---|---|
| 6,073,172 A * | 6/2000 | Frailong | H04L 41/0806 709/222 |
| 6,084,876 A * | 7/2000 | Kwok et al. | 370/379 |
| 6,473,863 B1 | 10/2002 | Genty et al. | |
| 6,487,594 B1 * | 11/2002 | Bahlmann | 709/225 |
| 6,523,696 B1 * | 2/2003 | Saito | H04N 21/2381 375/E7.019 |
| 6,614,781 B1 * | 9/2003 | Elliott | H04L 12/6418 370/352 |
| 6,674,749 B1 * | 1/2004 | Mattathil | 370/353 |
| 6,681,232 B1 * | 1/2004 | Sistanizadeh et al. | |
| 6,804,708 B1 * | 10/2004 | Jerding | G06Q 30/06 348/E5.002 |
| 6,853,680 B1 | 2/2005 | Nikolich | |
| 6,857,009 B1 * | 2/2005 | Ferreria | H04L 69/16 370/401 |
| 6,952,836 B1 * | 10/2005 | Donlan et al. | 725/116 |
| 6,988,130 B2 * | 1/2006 | Blumenau et al. | 709/213 |
| 7,003,481 B2 * | 2/2006 | Banka | G06Q 30/0601 705/26.1 |
| 7,068,597 B1 * | 6/2006 | Fijolek | H04L 41/0853 370/230 |
| 7,075,899 B2 * | 7/2006 | Sheehan | H04N 21/2362 348/729 |
| 7,080,400 B1 * | 7/2006 | Navar | 725/139 |
| 7,107,326 B1 * | 9/2006 | Fijolek | H04L 61/2015 709/220 |
| 7,134,131 B1 * | 11/2006 | Hendricks et al. | 725/31 |
| 7,194,756 B2 | 3/2007 | Addington | |
| 7,200,144 B2 * | 4/2007 | Terrell | H04L 45/00 370/389 |
| 7,219,124 B2 * | 5/2007 | Cerami | G06Q 10/087 370/351 |
| 7,287,257 B2 * | 10/2007 | Meza | 719/321 |
| 7,292,582 B2 * | 11/2007 | Kimber et al. | 370/395.54 |
| 7,293,282 B2 * | 11/2007 | Danforth et al. | 726/4 |
| 7,313,610 B2 * | 12/2007 | Held et al. | 709/222 |
| 7,324,515 B1 | 1/2008 | Chapman | |
| 7,349,430 B1 | 3/2008 | Chapman | |
| 7,359,434 B2 | 4/2008 | Shahar et al. | |
| 7,509,425 B1 * | 3/2009 | Rosenberg | H04L 65/1069 709/227 |
| 7,720,960 B2 * | 5/2010 | Pruss | G06Q 20/28 455/403 |
| 7,725,029 B1 * | 5/2010 | Bernier et al. | 398/67 |
| 7,757,261 B2 * | 7/2010 | Addington | H04L 41/5051 709/221 |
| 7,987,228 B2 * | 7/2011 | McKeown et al. | 709/202 |
| 8,543,681 B2 * | 9/2013 | Bearden | H04L 41/0213 709/218 |
| 8,839,220 B2 * | 9/2014 | Carter | G06F 8/61 717/168 |
| 9,077,760 B2 * | 7/2015 | McKeown | H04L 29/06 |
| 9,087,319 B2 * | 7/2015 | Nguyen | G06Q 10/10 |
| 2001/0033585 A1 | 10/2001 | Lazarus et al. | |
| 2001/0056350 A1 | 12/2001 | Calderone et al. | |
| 2002/0001316 A1 | 1/2002 | Homsby et al. | |
| 2002/0012353 A1 | 1/2002 | Gerszberg et al. | |
| 2002/0019984 A1 | 2/2002 | Rakib | |
| 2002/0065907 A1 * | 5/2002 | Cloonan et al. | 709/223 |
| 2002/0067725 A1 | 6/2002 | Oguchi et al. | |
| 2002/0071440 A1 | 6/2002 | Cerami | |
| 2002/0097728 A1 * | 7/2002 | Hinderks et al. | 370/395.52 |
| 2002/0143565 A1 | 10/2002 | Headings | |
| 2002/0191635 A1 | 12/2002 | Chow et al. | |
| 2003/0033612 A1 * | 2/2003 | Schwalb | H04N 21/4782 725/140 |
| 2003/0048380 A1 * | 3/2003 | Tamura | H04N 7/163 348/552 |
| 2003/0120819 A1 | 6/2003 | Abramson et al. | |
| 2003/0191848 A1 * | 10/2003 | Hesselink | H04L 67/125 709/229 |
| 2003/0196204 A1 * | 10/2003 | Thiagarajan | H04N 7/17318 725/61 |
| 2003/0200548 A1 | 10/2003 | Baran et al. | |
| 2003/0208695 A1 | 11/2003 | Soto et al. | |
| 2004/0001433 A1 | 1/2004 | Gram et al. | |
| 2004/0030804 A1 | 2/2004 | Wiget et al. | |
| 2004/0073912 A1 * | 4/2004 | Meza | G06F 9/4415 719/321 |
| 2004/0088737 A1 * | 5/2004 | Donlan et al. | 725/135 |
| 2004/0107284 A1 * | 6/2004 | Koperda et al. | 709/229 |
| 2004/0133793 A1 * | 7/2004 | Ginter | G06F 21/10 713/193 |
| 2004/0141759 A1 * | 7/2004 | Stiscia et al. | 398/168 |
| 2004/0158618 A1 * | 8/2004 | Shaw | H04W 72/0493 709/217 |
| 2004/0177133 A1 * | 9/2004 | Harrison et al. | 709/220 |
| 2004/0181811 A1 * | 9/2004 | Rakib | H04N 21/643 725/122 |
| 2004/0203630 A1 * | 10/2004 | Wang | H04W 8/18 455/414.1 |
| 2004/0210450 A1 * | 10/2004 | Atencio | H04L 41/18 705/30 |
| 2004/0261114 A1 | 12/2004 | Addington et al. | |
| 2004/0261126 A1 | 12/2004 | Addington | |
| 2005/0177861 A1 | 8/2005 | Ma et al. | |
| 2005/0228877 A1 | 10/2005 | Monitzer | |
| 2005/0265398 A1 | 12/2005 | Chapman et al. | |
| 2006/0059107 A1 * | 3/2006 | Elmore et al. | 705/64 |
| 2006/0095945 A1 | 5/2006 | Carpenter et al. | |
| 2008/0002669 A1 * | 1/2008 | O'Brien et al. | 370/352 |
| 2008/0010300 A1 | 1/2008 | Bunn et al. | |

OTHER PUBLICATIONS

International Search Report for related International Application No. PCT/US04/28909, dated Apr. 11, 2005, 1 page.
Office Action from related U.S. Appl. No. 10/570,831, dated Mar. 10, 2011.
Office Action from related U.S. Appl. No. 10/570,831, dated Sep. 13, 2011.
Final Rejection mailed from USPTO dated Dec. 6, 2011 for U.S. Appl. No. 12/970,364.
Response to Canadian Office Action—CA 2,536,103—dated Mar. 25, 2015.
Canadian Office Action—CA Appl. 2,536,103—dated Dec. 11, 2015.

* cited by examiner

METHOD AND SYSTEM FOR INTERNET PROTOCOL PROVISIONING OF CUSTOMER PREMISES EQUIPMENT

CROSS-REFERENCE TO RELATED APPLICATIONS

This application is a continuation of U.S. patent application Ser. No. 10/570,832 filed Feb. 5, 2007, which claims priority to PCT Application No. PCT/US2004/028907 filed Sep. 7, 2004 which claims priority to U.S. Provisional Application No. 60/501,231 filed Sep. 5, 2003, the entire disclosures of which are herein incorporated by reference.

FIELD OF THE INVENTION

The present invention relates to methods for provisioning Customer Premises Equipment (CPE). In particular, the present invention relates to Internet Protocol (IP) provisioning for use in a cable network having a network provisioning unit (NPU) in communication with CPE having embedded settop boxes (eSTBs).

BACKGROUND OF THE INVENTION

Customer Premises Equipment (CPE) is a broad term intended to refer to devices located at a subscriber station of a cable subscriber that are used to receive signals from a cable network. In particular, the CPE may include an embedded settop box (eSTB) to receive television signals and to output the received signals to a television or other device for viewing. In addition, the CPE may include an embedded cable modem (eCM) to receive signals to control, provision, manage, and secure the CPE, such as through Data Over Cable Services Interface Specification (DOCSIS) Out-Of-Band (OOB) messaging.

A need exists for Internet Protocol (IP) provisioning of the eSTB of the CPE over a cable network.

SUMMARY OF THE INVENTION

The present invention contemplates a number of features and configurations to provide IP provisioning, including a system comprising a plurality of embedded settop boxes (eSTBs) and a network provisioning unit (NPU) in communication with the cable network.

The system preferably includes a plurality of eSTBs provided by at least two different vendors, wherein each eSTB is preferably configured to output IP provisioning requests to the network according to a first protocol. The NPU is preferably configured to receive the eSTB IP provisioning requests and output eSTB IP provisioning data in response thereto, wherein the eSTB IP provisioning data is outputted according to the first protocol such that provisioning of the eSTBs is standard for each vendor in so far as each eSTB utilizes the first protocol for provisioning. Preferably, the first protocol is defined according to a Dynamic Host Configuration Protocol (DHCP).

In accordance with one aspect of the present invention, the NPU preferably selects the provisioning data according to the vendor of the requesting eSTB. Preferably, the NPU determines the vendor of the requesting eSTB based on an eSTB vendor identifier included in the eSTB IP provisioning request. Preferably, the NPU includes a database comprising IP provisioning data associated by vendor identifiers with a plurality of eSTB vendors, wherein the NPU determines the vendor of the requesting eSTB by searching the database for a vendor identifier that matches with the eSTB vendor identifier. In accordance with one aspect of the present invention, the eSTB vendor identifier may be a serial number, a hardware version, a software version, an Organization Unique Identifier (OUI), a model number, or a vendor name.

The above features and advantages, along with other features and advantages of the present invention, are readily apparent from the following detailed description of the invention when taken in connection with the accompanying drawings.

DETAILED DESCRIPTION OF THE PREFERRED EMBODIMENT(S)

Figure 1:
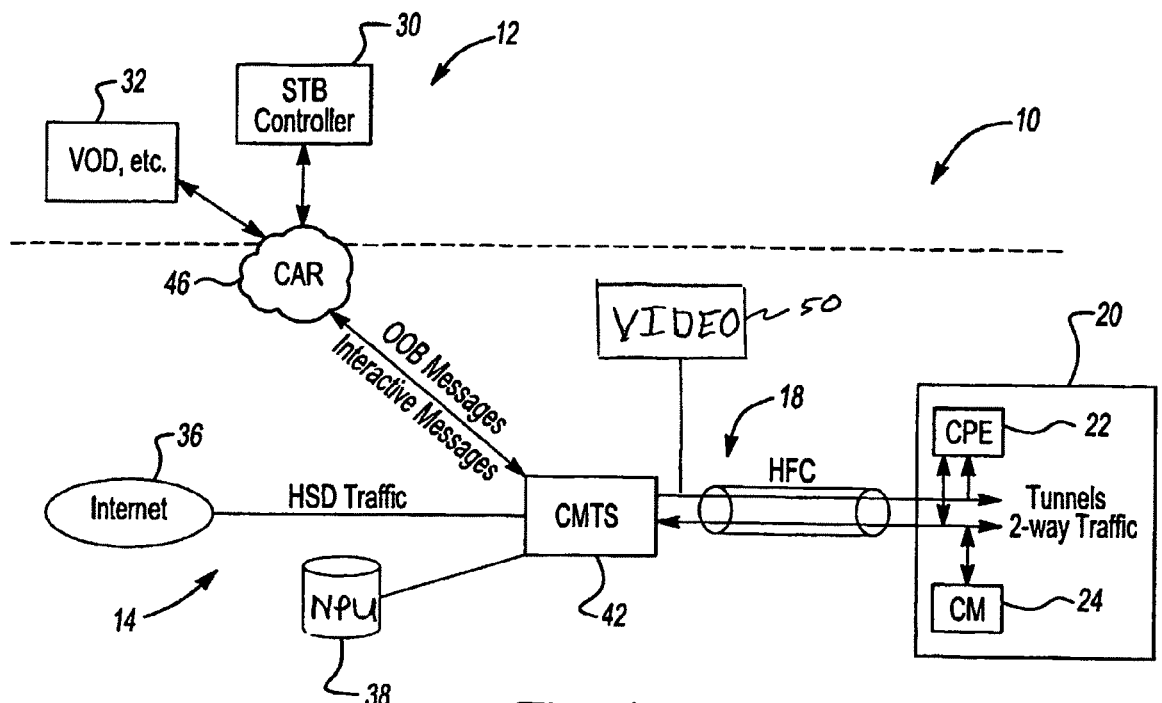
FIG. 1 illustrates a cable system in accordance with one aspect of the present invention.

FIG. 1 illustrates a cable system 10 in accordance with one aspect of the present invention. The system 10 includes a management network 12 and a High Speed Data (HSD) network 14 that respectively provide management and HSD services over a hybrid fiber coax (HFC) 18, or other communication medium, to a subscriber station 20, which includes Customer Premises Equipment (CPE) 22 and a cable modem (CM) 24.

The management network 12 generally comprises two portions, a control portion 30 and an application portion 32. The control portion 30 includes a settop box (STB) controller to control, provision, manage, and secure the CPE 22 through out-of-band (OOB) messaging. The application portion 32 provides applications to the CPE 22, such as video on demand (VOD), interactive television (iTV), and other services.

The HSD network 14 provides data services for the system 10, including services for the CM 24 to access the Internet 36. It includes a network provisioning unit (NPU) 38 having capabilities for Dynamic Host Configuration Protocol (DHCP), Trivial File Transfer Protocol (TFTP), and the like, in addition to a Domain Name System (DNS) server.

The system 10 includes a cable modem termination system (CMTS) 42 to send and receive signals to and from the CPE 22 and the CM 24 over the HFC 18. In general, the CMTS 42 transfers IP packets from the HSD network 14 and the management network 12 to the CPE 22 and CM 24 for processing. Preferably, the signals are outputted from the CMTS 42 on downstream output channels, which preferably include one-way output data tunnels, such as for OOB messaging. In addition, the CMTS 42 is configured to receive signals from the CPE 22 and the CM 24 to support two-way communication therewith, such as for transfer of IP packets from the CPE 22 and/or the CM 24 to the Internet 36 and/or the VOD or STB controller portions 32 and 30.

The system 10 includes a conditional access router (CAR) 46 to connect the management network 12 to the CMTS 42. The CAR 46 transports signals therebetween using IP protocols and provides firewall separation for the VOD or STB controller portions 32 and 30 from the HSD network 14, enhancing security from any devices attempting to associate with devices and signaling on the management network 12.

In operation, signaling traffic transported between the management network 12 and the CMTS 42 may be wrapped into addressable packets, such as Ethernet, IP, or other packets.

The system 10 includes a video unit 50 for delivering video signals to the subscriber station 20 over the HFC 18. The video unit 50 can deliver any number of video signals, including network television, cable television, pay-per-view, video on demand, and the like.

Figure 2:
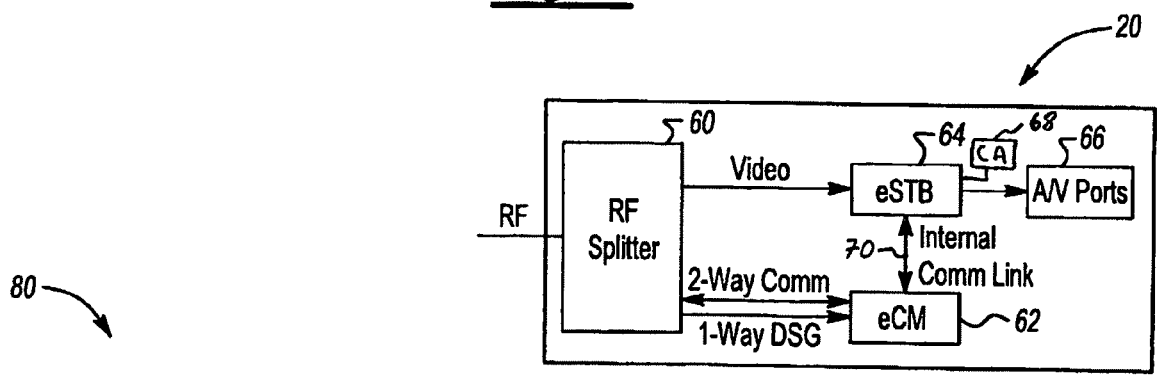
FIG. 2 illustrates Customer Premise Equipment (CPE) in accordance with one aspect of the present invention.

FIG. 2 illustrates the CPE 22 in accordance with one aspect of the present invention. The CPE 22 is preferably configured to communicate with the CMTS 42 through digital cable signals, such as through signaling defined by the Data Over Cable Service Interface Specification (DOCSIS) and/or through other protocols authorized through DHCP registration.

The CPE 22 includes a radio frequency (RF) splitter 60, an embedded cable modem (eCM) 62, an embedded set-top box (eSTB) 64, an audio visual (A/V) port 66, and an optional conditional access (CA) unit 68. The RF splitter 60 splits the RF signal into two portions—one for OOB control functions and two-way application traffic and one for video delivery. The OOB and two-way application traffic is relayed to the eCM 62 and the video is relayed to the eSTB 64.

The eSTB 64 outputs video and other media signals to a media output device (not shown) or other device connected to the A/V port 66, such as to a television (TV), digital video recorder (DVR), personal video recorder (PVR), or the like.

The eCM 62 processes control and other non-media signals, such as DOCSIS and other IP packets, and bridges or relays the signals to the eSTB 64 through an internal communications link 70. In particular, the communications link 70 is used to transfer data tunnels tuned to by the eCM 62 to the eSTB 64 so that OOB messaging signals can be delivered to the eSTB 64 for processing.

The CA unit 68 provides conditional access control for the subscriber station 20. It can be a CableCard, SmartCard, or other item for controlling security and access to the data, video, and control signals transmitted over the HFC 18. It is illustrated as a standalone item, however, it can be included with or embedded on the eSTB 64 or the eCM 62 to perform similar functions.

The eCM 62, eSTB 64, and CA unit 68 are logically separate entities, however, they may physically share hardware and software. Other items, such as control logic and applications may be included on the CPE 22 for controlling operation of the eSTB 64 and/or the eCM 62.

Figure 3:
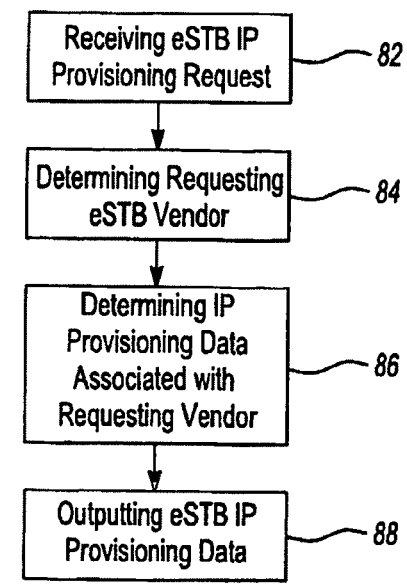
FIG. 3 illustrates a flowchart of method of eSTB IP provisioning in accordance with one aspect of the present invention.

FIG. 3 illustrates a flowchart 80 of method of eSTB IP provisioning in accordance with one aspect of the present invention. The method is preferably executed using DHCP protocols, however, the present invention is not so limited.

Block 82 relates to receiving an eSTB IP provisioning request at the NPU 38 from at least two eSTBs 64 associated with two different vendors. The receipt of multiple eSTB IP provisioning requests from different vendors requires the system 10 to support IP provisioning according to the configuration and operation of the different vendors.

Block 84 relates to determining the vendors associated with the requesting eSTBs 64. For example, if two eSTB IP provisioning requests are received from eSTBs 64 from a first vendor and a second vendor, the second vendor being different from the first vendor, the first and second vendors must be identified. Preferably, the eSTB IP provisioning requests each include an eSTB vendor identifier for identifying the vendor, such as a serial number, a hardware version, a software version, an Organization Unique Identifier (OUI), a model number, or a vendor name.

Block 86 relates to determining eSTB IP provisioning data associated with the vendor identified in block 84. Preferably, the NPU 38 includes a database (not shown) having IP provisioning data for each vendor supported by the system 10, including the first and second vendor, which is associated with a vendor identifier. The NPU 38 is configured to compare the eSTB vendor identifier against the vendor identifiers in the database to determine the vendor associated with the requesting eSTB 64.

Block 88 relates to outputting the eSTB IP provisioning data to the requesting eSTB 64. In particular, the NPU 38 receives a request from a specific eSTB 64 in 82, and replies to that specific eSTB 64 in block 88 to preferably provide eSTB IP provisioning data for enabling IP address assignment to the eSTB 64 to help the eSTB 64 communicate to the rest of the system 10 and other networks connected thereto, such as through the Internet 36, and to provide eSTB IP provisioning data for supplying parameter values to the eSTBs 64 for eSTB and application initialization. For example, the eSTB 64 may learn the location of a DNS server through IP provisioning, so that it can look up the hostname of the VoD server 32 and communicate with it. In another example, the eSTB 64 may receive a parameter that instructs the eSTB 64 to disable a vendor-specific A/V port, because usage of that particular A/V port may require a special customer subscription. The corresponding parameter in IP provisioning may be vendor-specific, so it is important that the NPU 38 not send this vendor-specific parameter to all eSTBs 64.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
    receiving, from a user device and by a computing device, a request for services, wherein the request comprises an identifier of the user device;
    determining, by the computing device and based on a database and the identifier, a vendor associated with the user device, wherein the database comprises a plurality of identifiers and associated vendors; and
    sending, by the computing device and to the user device, and based on the determined vendor, vendor-specific data comprising:
    information enabling the user device to receive bi-directional data via a first portion of a network and to receive video services via a second portion of the network.

2. The method of claim 1, further comprising:
    separating, using a firewall, the computing device from a management network comprising a content controller device and a device controller.

3. The method of claim 1, wherein the method is performed in a content delivery system.

4. The method of claim 1, wherein the user device comprises a client premises device.

5. The method of claim 1,
    wherein the determining the vendor comprises searching the database for an identifier, from the plurality of identifiers, that matches with the identifier of the user device.

6. The method of claim 1, wherein the identifier comprises at least one of a serial number, a hardware version, a software version, an Organization Unique Identifier (OUI), a model number, or a vendor name.

7. The method of claim 1, further comprising: processing the request according to a Dynamic Host Configuration Protocol (DHCP).

8. The method of claim 1, wherein the vendor-specific data further comprises:
a parameter causing disabling of an audio-visual output port of the user device from outputting vendor-specific media signals from the user device to a media output device associated with the user device.

9. The method of claim 8, wherein the audio-visual output port is disabled based on a subscription status associated with the user device with regard to a specific vendor.

10. The method of claim 1, further comprising:
receiving, from a second user device and by the computing device, a second request for services, wherein the second request comprises a second identifier of the second user device;
determining, from the database and based on the second identifier, a second vendor associated with the second user device, wherein the second vendor is different from the vendor associated with the user device; and
sending, to the second user device and based on the determined second vendor, second vendor-specific data comprising:
second information enabling the second user device to receive the bi-directional data via the first portion of the network and to receive the video services via the second portion of the network, wherein the second information is specific to the second vendor.

11. The method of claim 1, wherein information enabling the user device to receive bi-directional data comprises information enabling a data connection between the user device and an Internet, and wherein the video services comprise at least one of cable television, pay-per-view, or video on demand.

12. The method of claim 1, wherein the user device comprises an embedded settop box and an embedded cable modem.

13. The method of claim 1, wherein the user device comprises an embedded settop box;
wherein the request for services comprises an Internet Protocol (IP) provisioning request; and
wherein the information comprises embedded settop box IP provisioning data.

14. A method comprising:
receiving, by a computing device, a service request from a user device associated with a vendor, wherein the service request comprises an identifier of the user device;
separating a data network comprising the computing device from a management network comprising a content controller device and a device controller;
determining, by the computing device and based on the identifier, the vendor associated with the user device; and
sending, to the user device and based on the determined vendor, vendor-specific data comprising:
information enabling the user device to receive bi-directional data via a first portion of a network and to receive media services via a second portion of the network.

15. The method of claim 14, wherein the user device comprises a client premises device.

16. The method of claim 14, wherein the separating comprises separating by a firewall.

17. The method of claim 14, wherein the method is performed in a content delivery system.

18. The method of claim 14, further comprising:
confirming that the vendor-specific data is sufficient to program the user device to execute a set of operations associated with supporting the media services provided by a media service provider.

19. The method of claim 18, further comprising:
adjusting the vendor-specific data depending on whether the user device is associated with one of a first unit or a second unit, wherein the first unit and the second unit assist the media service provider in providing the media services.

20. A method comprising:
receiving, by a computing device and via a signaling pathway, and from a user device associated with a vendor, a service request according to a protocol, wherein the service request comprises an identifier of the user device;
determining, from a database and based on the identifier, the vendor associated with the user device, wherein the database comprises a plurality of identifiers and associated vendors; and
sending, via the signaling pathway to the user device and based on the determined vendor, vendor-specific data comprising:
information enabling the user device to receive bi-directional data via a first portion of a network and to receive video services via a second portion of the network.

21. The method of claim 20, wherein the user device comprises a client premises device.

22. The method of claim 20, further comprising separating a data network comprising the computing device, by a firewall, from a management network comprising a content controller device and a device controller.

* * * * *

UNITED STATES PATENT AND TRADEMARK OFFICE
CERTIFICATE OF CORRECTION

PATENT NO.       : 11,184,187 B2
APPLICATION NO.  : 12/829748
DATED            : November 23, 2021
INVENTOR(S)      : Woundy et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 306 days.

Signed and Sealed this
Eighteenth Day of February, 2025

Coke Morgan Stewart
*Acting Director of the United States Patent and Trademark Office*